United States Patent
Kim

(10) Patent No.: US 8,517,891 B2
(45) Date of Patent: Aug. 27, 2013

(54) CONTROL SYSTEM AND METHOD FOR CHANGING SPEED IN STARTING THE ENGINE OF A HYBRID VEHICLE

(75) Inventor: Sang Joon Kim, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 300 days.

(21) Appl. No.: 13/034,933

(22) Filed: Feb. 25, 2011

(65) Prior Publication Data

US 2012/0142489 A1 Jun. 7, 2012

(30) Foreign Application Priority Data

Dec. 3, 2010 (KR) ........................ 10-2010-0122442

(51) Int. Cl.
*B60K 1/02* (2006.01)
*F16H 3/72* (2006.01)

(52) U.S. Cl.
USPC .................................................. 477/3; 475/5

(58) Field of Classification Search
USPC ..... 477/3; 475/5, 150; 701/60; 180/65.265, 180/65.275, 65.285
See application file for complete search history.

(56) References Cited

U.S. PATENT DOCUMENTS 7,473,205 B2 * 1/2009 Shimizu et al. ................. 477/3
7,836,987 B2 * 11/2010 Aoki ........................ 180/65.265

FOREIGN PATENT DOCUMENTS

| JP | 10023607 A | 1/1998 |
| JP | 10212983 A | 8/1998 |
| JP | 2008149886 A | 7/2008 |
| JP | 2009214598 A | 9/2009 |
| KR | 10-0831185 | 1/2007 |
| KR | 10-0815307 | 2/2008 |

* cited by examiner

*Primary Examiner* — Roger Pang
(74) *Attorney, Agent, or Firm* — Edwards Wildman Palmer LLP; Peter F. Corless

(57) ABSTRACT

The present invention relates to a control system and method for changing speed in starting an engine of a hybrid vehicle that is capable of preventing the occurrence of shift shock. In a hybrid vehicle which includes an engine, a first motor for controlling the engine cranking and engine speed, a second motor that is a traction motor for directly transmitting torque to the axle, a first planet gear set in connection between the engine and the first motor, and a second planet gear set in connection between the engine and the second motor, the control system comprises: a PI control part which instructs a calculated torque to the second motor after calculating the torque, wherein the torque corresponds to the target speed of the second motor; and an engine friction torque feed-forward part for transmitting torque to the PI control part by a feed-forward term control method during starting of the engine, wherein the torque corresponds to the reacting power transmitted to the second motor.

4 Claims, 4 Drawing Sheets

CONTROL SYSTEM AND METHOD FOR CHANGING SPEED IN STARTING THE ENGINE OF A HYBRID VEHICLE

CROSS-REFERENCE TO RELATED APPLICATION

This application claims under 35 U.S.C. §119(a) the benefit of Korean Patent Application No. 10-2010-0122442 filed Dec. 3, 2010, the entire contents of which are incorporated herein by reference.

BACKGROUND

1. Technical Field

The present invention relates to a control system and method for changing speed in starting an engine of a hybrid vehicle, and more particularly to a control system and method that is further capable of preventing the occurrence of shift shock.

2. Background Art

In general, hybrid vehicles which adopt an engine as well as a motor driving source as an auxiliary power are future oriented vehicles capable of reducing exhausts and improving fuel efficiency.

With reference to FIG. 1, the constitution of a power train for transmitting power of such a hybrid vehicle is described below as an example.

A power train for the hybrid vehicle in FIG. 1, comprises an engine 10, a first motor MG1 controlling a change in speed of an engine crank and an engine, a second motor MG2 that is a traction motor for directly transmitting torque to the axle, and a pair of planet gear sets 20, 22.

The output axle of the engine 10 is connected with a carrier C1 of the first planet gear set 20, and at the same time is connected with a second sun gear 52 of the second planet gear set 22 through a second dutch CL2.

The output axle of the first motor MG1 is directly connected with a sun gear S1 of the first planet gear set 20, and the output axle of the second motor MG2 is directly connected with the second sun gear S2 of the second planet gear set 22.

As shown, a ring gear R1 of the first planet gear set 20 is connected with a carrier C2 of the second planet gear set 22, which in turn is connected to the final output axle.

Also, a ring gear R2 of the second planet gear set 22 is connected to the output side of the carrier C1 in the first planet gear set 20 through a first dutch CL1.

As further shown, a first brake BK1 is equipped in the connecting axle between the first motor MG1 and the sun gear S1 of the first planet gear set 20, and a second brake BK2 is equipped in the connecting axle between the ring gear R2 of the second planet gear set 22 and the output side of the carrier C1 in the first planet gear set 20.

In the power train structure of such a hybrid vehicle, torque for cranking the engine is generated in the first motor MG1 which controls the engine speed. The second motor MG2 performs the traction motor function directly transmitting torque to the axle, and at the same time, controls the speed of the ring gear R2 of the second planet gear set 22 so as to follow the target speed based on the driving situation.

In the power train system of the hybrid vehicle described above, all the functional elements including the brake and the dutch are enabled and disabled by oil-pressure control under the neutral position (P or N) of the movable running gear.

For example, for shifting to the driving gear (i.e. R or D gear) from the neutral gear i.e. P or N gear) with ease, it may be controlled such that the speed of the ring gear R2 in the second planet gear set 22 is maintained at 0 so as to connect with the second brake (Brake 2) easily. Alternatively, it may be controlled such that the speed of the ring gear R2 in the second planet gear set 22 is the same as that of the carrier C1 in the first planet gear set 20 for easily connecting with the first dutch (Clutch 1).

Accordingly, since the speed of the ring gear R2 in the second planet gear set 22 maintains the target speed during general driving situations (after starting the engine), a shock state is not generated under the static shift to the D gear from the N gear, or to the N gear from the D gear. However, a shock state may be generated when the static shift is performed during engine start-up.

Namely, in order to follow the target speed of the ring gear R2, a feedback control using, for example, a PI control part (i.e. proportional-integral control part) may be preformed against the speed of the second motor MG2. However, the target speed of the ring gear R2 is not maintained due to the falling of the transient response (the response as the output goes to the normal state) in controlling the feedback. This generates a shock state when the functional elements of the second planet gear set are connected.

As such, once the static shift to the D or R gear from the P or N gear is performed during engine start-up, the reacting power corresponding to the engine friction works toward the output axle of the second motor MG2, which generates an instant drop in speed of the second motor MG2. As a result, the ring gear R2 in the second planet gear set 22 deviates from the target speed instantly to generate a shock state when shifting from the neutral gear (P or N) to the driving gear (R or D).

SUMMARY OF THE DISCLOSURE

The present invention provides a control system and method for changing speed in starting an engine of a vehicle, particularly a hybrid vehicle. In particular, according to the present invention, a torque that is similar or equivalent to the reacting power corresponding to the engine friction is applied to the second motor when shifting from the P or N gear to the D or R gear during engine start-up. For example, a suitable torque can be applied to the second motor using, for example, feed-forward control when shifting from the P or N gear to the D or R gear. As such, a drop in the speed in the second motor and a change in the speed in the ring gear can be prevented. Further, the occurrence of shock may be prevented when shifting from the neutral gear to the D or R gear during engine start-up.

According to one aspect of the invention, a control system is provided for changing speed in starting an engine of a hybrid vehicle which includes an engine, a first motor for controlling the engine cranking and engine speed, a second motor that is a traction motor for directly transmitting torque to the axle, a first planet gear set in connection between the engine and the first motor, and a second planet gear set in connection between the engine and the second motor. According to this aspect, the control system can comprise a proportional-integral (PI) control part or the like for transmitting a calculated torque to the second motor. For example, the PI control part can first calculate the torque corresponding to the target speed of the second motor by receiving the target speed of the second motor, and thereafter transmit this calculated torque to the second motor for following the target speed of the ring gear in the second planet gear set. The control system can further comprise a mechanism, such as an engine friction torque feed-forward part, for transmitting torque to the PI control part, for example by use of a feed-forward term control method, during engine start-up, wherein the torque transmitted to the PI control part corresponds to the reacting power transmitted to the second motor.

Another embodiment of the present invention comprises a step of computing the torque after feedback-controlling the output torque of the second motor for following the target speed of the ring gear in the second planet gear set during starting of the engine at the P or N gear as the shift gear; and a step of transmitting the final torque to the second motor, wherein the final torque is the sum of the torque corresponding to the feed-forward term and the torque corresponding to the reaction power transmitted to the second motor from the engine.

Preferably, the torque corresponding to the reacting power transmitted to the second motor from the engine is established as the feed-forward term according to the feed-forward term control, and is added to the output torque calculated by the feedback control.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle has two or more kinds of power sources, for example, a gasoline and electricity.

BRIEF DESCRIPTION OF THE DRAWINGS

The accompanying drawings, together with the specification illustrate exemplary embodiments of the present invention, and, together with the description, serve to explain the principles of the present invention.

DETAILED DESCRIPTION OF THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention.

Hereinafter, exemplary embodiments of the present invention will be described in more detailed with reference to the accompanying drawings.

Figure 1:
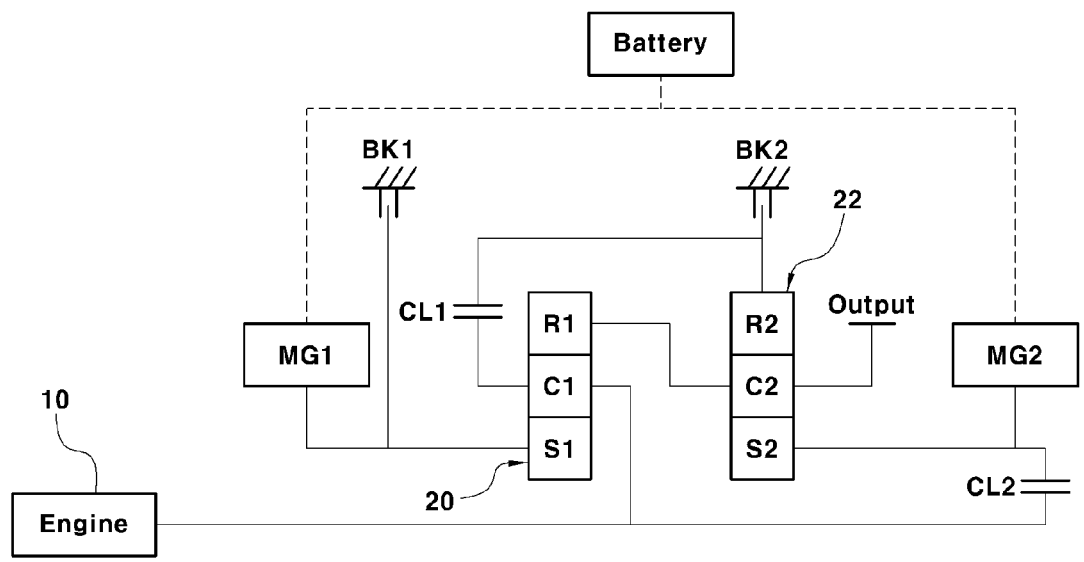
FIG. 1 is a constitutional view of the power train adopting a control system and method for changing speed in starting an engine of a hybrid vehicle according to the present invention.

As explained herein with referring to FIG. 1, a control system and method for changing speed during the starting of an engine in a vehicle, particularly a hybrid vehicle, according to the present invention comprises an engine 10, a first motor MG1 for controlling a change in speed of an engine crank and an engine, a second motor MG2 that is a traction motor for directly transmitting torque to the axle, and a pair of planet gear sets 20, 22.

In particular, the torque for cranking of the engine is generated in the first motor MG1, which controls the engine speed. The second motor MG2 performs a traction motor function and directly transmits torque to the axle, and at the same time, controls speed of the ring gear for the ring gear R2 of the second planet gear set 22 so as to follow the target speed based on the driving situation.

According to an aspect of the present invention, a torque that is as much as or similar to the reacting power corresponding to the engine friction is applied to the second motor when shifting from the P or N gear to the D or R gear during engine start-up. The torque can be applied to the second motor using any suitable means, such as for example feed-forward control. By applying a torque that is similar or as much as the reacting power corresponding to the engine friction, a drop of the speed in the second motor and a change of the speed in the ring gear can be prevented. Accordingly, the occurrence of the shock may be easily prevented when shifting from the neutral state to D or R gear during engine start-up.

As described herein, since the speed of the ring gear R2 in the second planet gear set 22 maintains the target speed during general driving situations (after starting the engine), the shock status is not generated under the static shift from the N gear to the D gear or from the D gear to the N gear. However, once the static shift from the P gear or N gear to the D gear or R gear is generated during engine start-up, the reacting power corresponding to the engine friction is working toward or being transmitted toward the output axle of the second motor MG2. This generates an instant drop in speed of the second motor MG2, and thus the ring gear R2 in the second planet gear set 22 deviates from the target speed instantly to generate a shock state when shifting from the neutral gear (P or N) to the driving gear (R or D).

In other words, according to some embodiments in the neutral gear (P or N), it may be controlled such that the speed of the ring gear R2 in the second planet gear set 22 is maintained at 0 so as to be connected with the second brake (Brake 2) easily. In alternative embodiments, or it may be controlled such that the speed of the ring gear R2 in the second planet gear set 22 is the same or substantially the same as that of the carrier C1 in the first planet gear set 20 for ease in connecting with the first dutch (Clutch 1). However, when the static shift from the P gear or N gear to the D gear or R gear is generated at the same time in engine start-up, the reacting power corresponding to the engine friction is working toward or transmitted toward the output axle of the second motor MG2. As a result, the ring gear R2 in the second planet gear set 22 deviates from the target speed instantly to generate a shock state when the dutch for coupling with the carrier C1 is coupled, or when the first brake is coupled.

Figure 2:
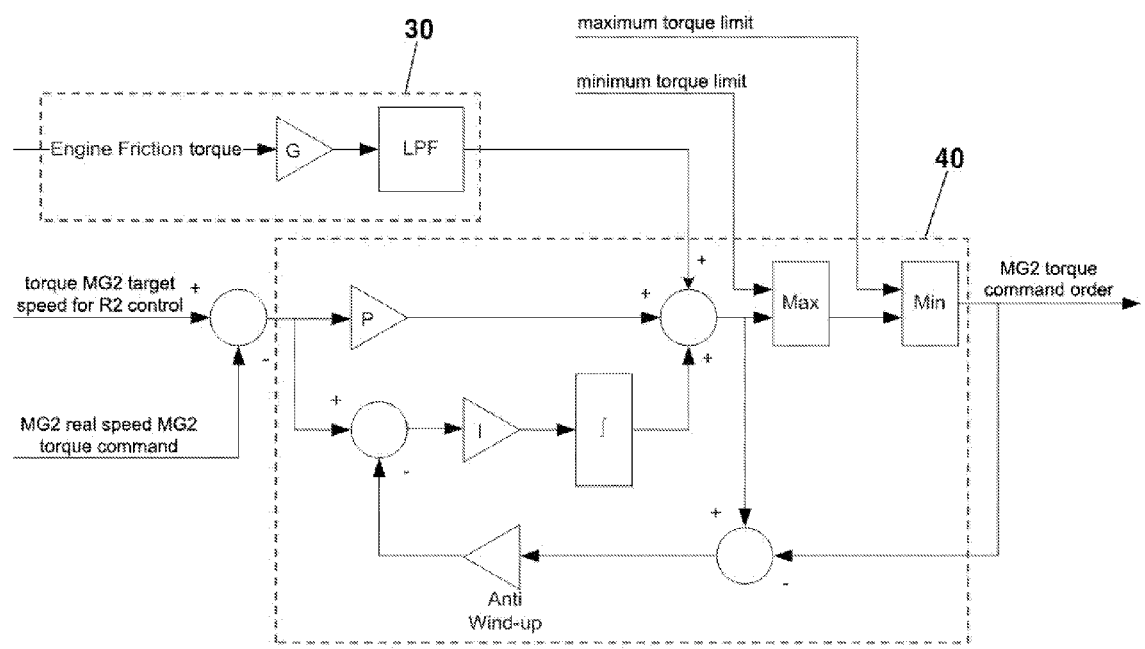
FIG. 2 is a control block diagram illustrating the control system for changing speed in starting the engine of the hybrid vehicle according to the present invention.

According to an embodiment of the present invention, the control system for changing speed in starting an engine of a vehicle, particularly a hybrid, as illustrated in FIG. 2, comprises a PI control part 40 or the like for instructing or transmitting a calculated torque to the second motor MG2. In particular, after calculating the torque corresponding to the target speed of the second motor MG2 by receiving the target speed of the second motor MG2, the PI control part 40 instructs or transmits this calculated torque to the second motor MG2 so as to thereby follow the target speed of the ring gear R2 in the second planet gear set 22; and an engine friction torque feed-forward part 30 or the like for transmitting a torque to the PI control part 40, for example by a feed-forward term control method, during engine start-up, wherein the torque corresponds to the reacting power transmitted to the second motor MG2.

Figure 3:
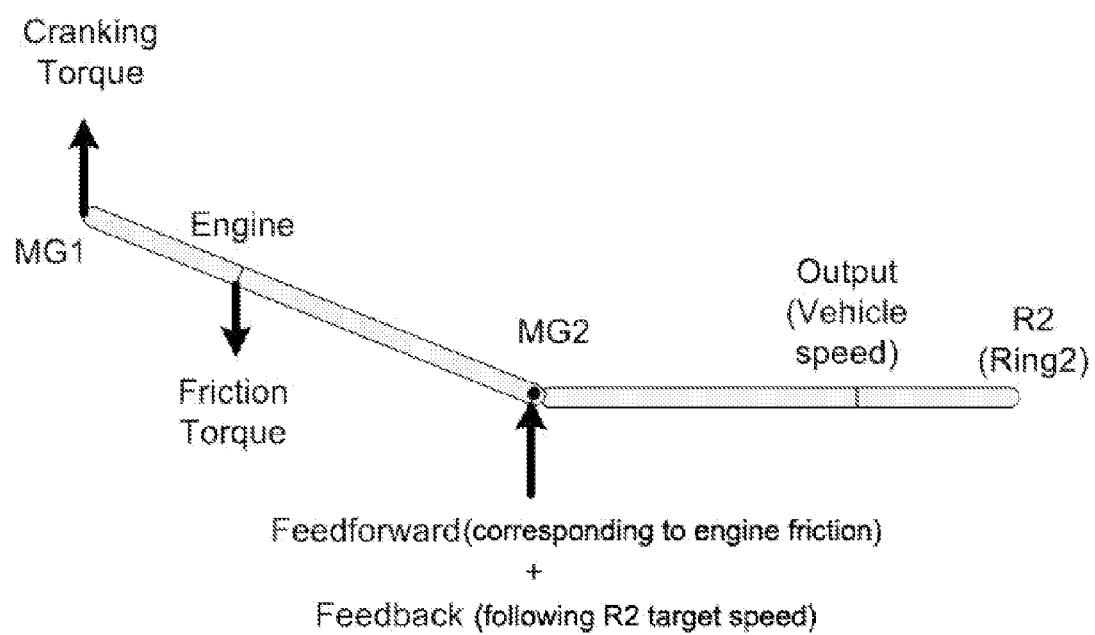
FIG. 3 is a speed line view explaining a control method for changing speed in starting the engine of the hybrid vehicle according to the present invention.
Figure 4:
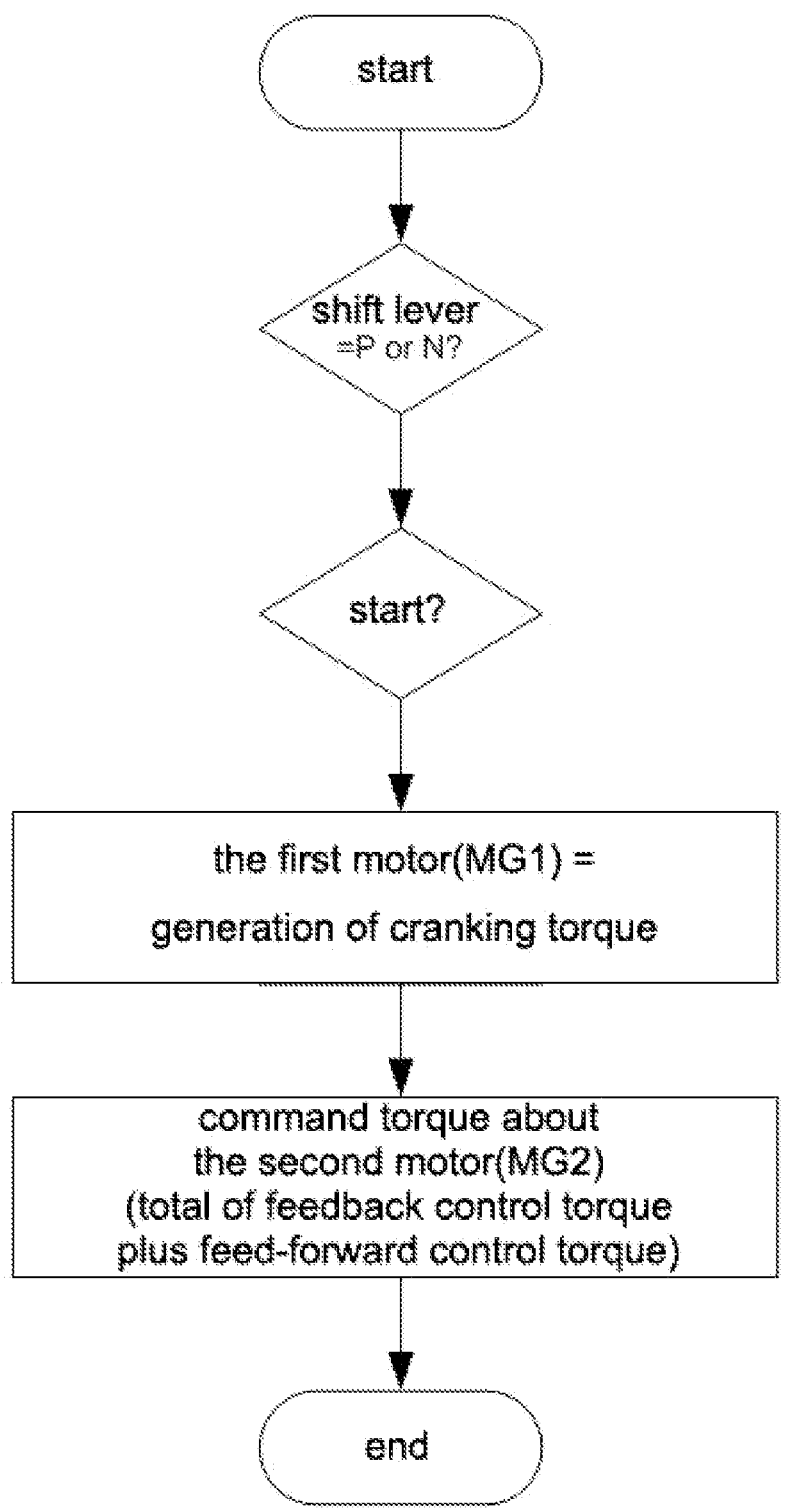
FIG. 4 is a sequence diagram explaining the control method for changing speed in starting the engine of the hybrid vehicle according to the present invention.

Hereinafter, the control system for changing speed in starting an engine in a hybrid vehicle of the present invention based on the constitution of the system will be further described in more detail with reference to FIG. 2 to FIG. 4.

When the target speed of the second motor MG2 for following the target speed of the ring gear R2 in the second planet gear set 22 enters into the PI control part 40 when starting at the P or N gear for shifting, the torque of the second motor is calculated in the PI control part 24 based on the target speed of the second motor MG2. Then the calculated torque is transmitted to the second motor MG2. As a result, the speed of the ring gear R2 in the second planet gear set 22 is controlled so as to follow the target speed of the second motor MG2.

At this time, a final torque transmitted to the second motor MG2 includes the feedback-controlled torque in the PI control part 40 as well as the torque corresponding to the reacting power transmitted to the second motor MG2 from the engine 10.

Namely, when the engine is started by the cranking torque of the first motor MG1, the torque corresponding to the reacting power transmitted to the second motor MG2 is transmitted to the PI control part 40, for example by the feed-forward term control method in the engine friction torque feed-forward part 30. As such, the torque corresponding to the reacting power transmitted to the second motor MG2 from the engine 10 is set as the feed-forward term according to feed-forward term control. This torque is further combined with the output torque calculated by the feedback control in the PI controller 40, to provide a resulting combined final torque that is transmitted to the second motor MG2.

Therefore, a torque which is as much as or similar to the reacting power corresponding to the engine friction is applied to the second motor (e.g. using the feed-forward control) when shifting from the P or N gear to the D or R gear during engine start-up, which prevents a drop in the speed in the second motor. Further, the occurrence of shock in coupling with the ring gear and operating elements may be prevented since the ring gear R2 in the second planet gear set 22 does not deviate from the target speed.

What is claimed is:

1. A control system for changing speed in starting an engine of a hybrid vehicle, wherein the vehicle includes an engine, a first motor for controlling the engine cranking and engine speed, a second motor that is a traction motor for directly transmitting torque to the axle, a first planet gear set in connection between the engine and the first motor, and a second planet gear set in connection between the engine and the second motor, wherein the control system comprises:
a PI control part for calculating a torque corresponding to a target speed of the second motor by receiving the target speed of the second motor, and for transmitting the calculated torque to the second motor thereby following the target speed of a ring gear in the second planet gear set; and
an engine friction torque feed-forward part for transmitting a torque to the PI control part by a feed-forward term control method during starting of the engine, wherein the torque corresponds to a reacting power transmitted to the second motor.

2. A control system for changing speed in starting an engine of a hybrid vehicle, wherein the vehicle includes an engine, a first motor for controlling the engine cranking and engine speed, a second motor for directly transmitting torque to the axle, a first planet gear set in connection between the engine and the first motor, and a second planet gear set in connection between the engine and the second motor, wherein the control system comprises:
a PI control part for receiving a target speed of the second motor, for calculating a torque corresponding to the target speed of the second motor, and for transmitting the calculated torque to the second motor, wherein the calculated torque follows a target speed of a ring gear in the second planet gear set; and
an engine friction torque feed-forward part for transmitting a torque to the PI control part during starting of the engine, wherein the torque corresponds to a reacting power transmitted to the second motor.

3. A control method for changing speed in starting an engine of a hybrid vehicle, the hybrid vehicle comprising an engine, a first motor, a second, a first planet gear set in connection between the engine and the first motor, and a second planet gear set in connection between the engine and the second motor, the method comprising the steps of:
calculating, by a PT control part, a torque corresponding to a target speed of the second motor using the target speed of the second motor,
transmitting, by the PI control part, the calculated torque to the second motor thereby following the target speed of a ring gear in the second planet gear set; and
transmitting, by an engine friction torque feed-forward part, a torque to the PI control part by a feed-forward term control method during starting of the engine, wherein the torque corresponds to a reacting power transmitted to the second motor.

4. The control method for changing speed while starting an engine of a hybrid vehicle according to claim 3, wherein the torque corresponding to the reacting power transmitted to the second motor from the engine is established as the feed-forward term according to a feed-forward term control, and wherein the torque is added to the output torque calculated by the PI control part.

* * * * *